United States Patent [19]

Bresciani

[11] Patent Number: 5,093,472
[45] Date of Patent: Mar. 3, 1992

[54] REMOVAL OF RESIDUAL SOLVENT FROM ACRYLIC ACID POLYMER

[75] Inventor: Angelo Bresciani, Bergamo, Italy

[73] Assignee: Sigma Prodotti Chimici S.R.L., Milan, Italy

[21] Appl. No.: 465,386

[22] Filed: Jan. 16, 1990

[30] Foreign Application Priority Data

Jan. 26, 1989 [IT] Italy ............................. 19191 A/89

[51] Int. Cl.$^5$ ............................................. C08F 6/00
[52] U.S. Cl. ........................................ 528/503; 34/10; 34/30
[58] Field of Search ........................... 528/483, 503; 525/330.2, 388; 34/10, 30

[56] References Cited

U.S. PATENT DOCUMENTS

| | | | |
|---|---|---|---|
| 4,518,768 | 5/1985 | Scheurer et al. | 528/483 |
| 4,525,581 | 6/1985 | Denzinger et al. | 528/503 |
| 4,546,160 | 10/1985 | Brand et al. | 526/317.1 X |
| 4,929,690 | 5/1990 | Goertz et al. | 525/330.2 X |

OTHER PUBLICATIONS

1990 U.S. Pharmacopeia National Formulary U.S.P. XXII, NF XVII, pp. 1910–1912.
Chemical Abstracts Data Base Computer Printout of Sept. 11, 1990.

*Primary Examiner*—Fred Teskin
*Attorney, Agent, or Firm*—Walter H. Schneider

[57] ABSTRACT

The present invention relates to an acrylic acid synthetic polymer, said polymer being cross-linked, having high molecular weight and containing 56% to 68% by weight carboxy groups (—COOH), characterized in that it contains no more than 10 ppm solvent; and to a process for the preparation thereof.

2 Claims, No Drawings

REMOVAL OF RESIDUAL SOLVENT FROM ACRYLIC ACID POLYMER

The present invention relates to a acrylic acid synthetic polymer being cross-linked, having high molecular weight and containing 56% to 68% by weight carboxy groups (—COOH), characterized in that it contains no more than 10 ppm solvent.

The present invention also relates to a process for the preparation of said polymer containing no more than 10 ppm solvent.

A number of acrylic acid synthetic polymers are known. Particularly known is the series of "Carbomer" (common name used, inter alia, by CFTA, which name will hereinafter be used for convenience), which are defined based on the European and USA Pharmacopeiae as acrylic acid synthetic polymers which are cross-linked, have high molecular weights, contain, under standardized conditions, 56% to 68% by weight carboxy groups (—COOH). The so defined products have pH about 3 and a viscosity of a 2.50 g solution in 500 ml water between 30,000 and 40,000 centipoises.

The commercially available products obtained according to various processes contain impurities. Particularly, no products containing less than 100 ppm residual solvents have hitherto been described. Benzene and ethyl acetate are among the more frequently present solvents. Specifically, the content in the latter is generally about 2% (20,000 ppm).

The above cited polyacrylic acid (for instance Carbomer 940) is used in remarkable amounts as a thickening agent for cosmetic and pharmaceutical preparations, in which a high residual solvent content is obviously highly undesirable.

In fact, most of the solvents are known to have negative physiological effects due to both the toxicity thereof (which can be very high, e.g. in case of benzene) and the frequent allergic phenomena they cause.

Moreover, from a merely technical point of view, the presence of solvent traces can substantially change physical characteristics of the product, making it less interesting as a thickening agent for pharmaceutical and cosmetic preparations.

Now it has surprisingly been found that a polyacrylic acid of the above described type, substantially free from the above cited impurities and particularly containing no more than 10 ppm residual solvents, can be obtained by subjecting polyacrylic acid to a particular drying process.

According to the invention, a starting polyacrylic acid containing 500 to 1,000 ppm residual solvent is placed into a drier, particularly a fluidized bed drier, suitably provided with a powder/air mixing device, in which drying is carried out by means of a pre-heated fluid. Any inert fluid can be used, but air is preferred due to cost reasons. Pre-heating temperature is 60°-80° C.

Treatment is continued until reducing the residual solvent contents to the desired limits. Generally a 8 to 10 hour treatment allows to fall below 10 ppm residual solvent.

The following example further illustrates the invention, without limiting it.

EXAMPLE

A polyacrylic acid containing 63% by weight carboxy groups and having a 800 ppm methylene chloride residual content was placed into a fluidized bed drier of commercial type, provided with a powder/air mixing device. Fluidization was carried out by blowing in dry air pre-heated to 78°±2° C. Air flow rate was adjusted so as to obtain an effective fluidization, at the same time keeping the product entrainment to the air filtering device within technically acceptable limits. Treatment was carried out for 9 hours under the indicated conditions.

The resulting product, after cooling, was analyzed for residual solvent contents, giving the following analytical results:

$CH_2Cl_2: 7 \pm 1$ ppm

I claim:

1. A process for preparing a cross-linked, high molecular weight synthetic carbomer polymer of acrylic acid containing 56-68% by wt. carboxy groups and having a residual solvent content no greater than 10 ppm which comprises subjecting a particulate, solid polymer as defined above but having a residual solvent content of 500-1,000 ppm to fluidized bed drying with an inert fluid stream pre-heated to 60°-80° C.

2. A process for preparing a cross-linked, high molecular weight synthetic Carbomer polymer of acrylic acid containing 56-68% by wt carboxy groups and having a residual methylene chloride content no greater than 10 ppm, which comprises subjecting a particulate, solid polymer as defined above but having a residual methylene chloride content of 500-1000 ppm to fluidized bed drying with an inert fluid stream pre-heated to 60°-80° C.